(12) United States Patent
Hirakawa

(10) Patent No.: US 11,939,449 B2
(45) Date of Patent: Mar. 26, 2024

(54) LIQUID CRYSTAL POLYESTER COMPOSITION AND MOLDED BODY

(71) Applicant: SUMITOMO CHEMICAL COMPANY, LIMITED, Tokyo (JP)

(72) Inventor: Atsushi Hirakawa, Katsuragi (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/638,056

(22) PCT Filed: Aug. 31, 2020

(86) PCT No.: PCT/JP2020/032815
§ 371 (c)(1),
(2) Date: Feb. 24, 2022

(87) PCT Pub. No.: WO2021/044991
PCT Pub. Date: Mar. 11, 2021

(65) Prior Publication Data
US 2022/0275170 A1    Sep. 1, 2022

(30) Foreign Application Priority Data

Sep. 4, 2019    (JP) ................................ 2019-161354

(51) Int. Cl.
*C08K 3/34* (2006.01)
*C08G 63/60* (2006.01)

(52) U.S. Cl.
CPC .............. *C08K 3/346* (2013.01); *C08G 63/60* (2013.01); *C08K 2201/003* (2013.01); *C08K 2201/005* (2013.01)

(58) Field of Classification Search
CPC .............. C08K 3/346; C08K 2201/003; C08K 2201/005; C08G 63/60
See application file for complete search history.

(56) References Cited

U.S. PATENT DOCUMENTS

| | | | |
|---|---|---|---|
| 6,797,198 B1 | 9/2004 | Miyashita et al. | |
| 9,085,672 B2 | 7/2015 | Matsubara et al. | |
| 2010/0163796 A1 | 7/2010 | Fukuhara et al. | |
| 2015/0038631 A1* | 2/2015 | Hamaguchi | B29B 9/12 524/449 |

(Continued)

FOREIGN PATENT DOCUMENTS

| | | |
|---|---|---|
| CN | 108137906 A | 6/2018 |
| JP | 03-167252 A | 7/1991 |

(Continued)

OTHER PUBLICATIONS

English machine translation of JP 2013-125740A (Year: 2013).*

(Continued)

*Primary Examiner* — John E Uselding
(74) *Attorney, Agent, or Firm* — Rimon P.C.

(57) ABSTRACT

A liquid crystal polyester composition is provided, containing a liquid crystal polyester and a plate-like inorganic filler, in which a ratio (D50/D50*) of median diameters of the plate-like inorganic filler is 3.0 to 6.0. The D50 is a median diameter of the plate-like inorganic filler measured by a laser diffraction method. The D50* is a median diameter of the plate-like inorganic filler measured by a centrifugal sedimentation method.

12 Claims, 1 Drawing Sheet

(56) References Cited

U.S. PATENT DOCUMENTS

| | | |
|---|---|---|
| 2015/0353827 A1 | 12/2015 | Hegi |
| 2018/0084942 A1 | 3/2018 | Saito et al. |
| 2018/0346641 A1 | 12/2018 | Hegi |
| 2018/0346642 A1 | 12/2018 | Hegi |

FOREIGN PATENT DOCUMENTS

| | | | | |
|---|---|---|---|---|
| JP | 2001-106923 A | 4/2001 | | |
| JP | 2003-136645 A | 5/2003 | | |
| JP | 2010-168574 A | 8/2010 | | |
| JP | 2011-074130 A | 4/2011 | | |
| JP | 2011-074131 A | 4/2011 | | |
| JP | 2013125740 A * | 6/2013 | ............... | H01B 7/28 |
| JP | 5597986 B2 | 10/2014 | | |
| JP | 2015-096586 A | 5/2015 | | |
| JP | 2016-014137 A | 1/2016 | | |
| JP | 6175720 B1 | 8/2017 | | |
| WO | 2012/137271 A1 | 10/2012 | | |
| WO | 2013/128887 A1 | 9/2013 | | |
| WO | 2016/153048 A1 | 9/2016 | | |
| WO | 2017/051862 A1 | 3/2017 | | |
| WO | 2017/051883 A1 | 3/2017 | | |

OTHER PUBLICATIONS

Chinese Office Action issued in corresponding Chinese Patent Application No. 202080061419.1, dated Feb. 15, 2023, with English translation.

Japanese Notice of Reasons for Rejection issued in corresponding Japanese Patent Application No. 2021-543748, dated Feb. 7, 2023, with English translation.

International Search Report issued in corresponding International Patent Application No. PCT/JP2020/032815, dated Nov. 17, 2020, with English translation.

Chinese Office Action issued in corresponding Chinese Patent Application No. 202080061419.1, dated Aug. 30, 2023, with English translation.

* cited by examiner

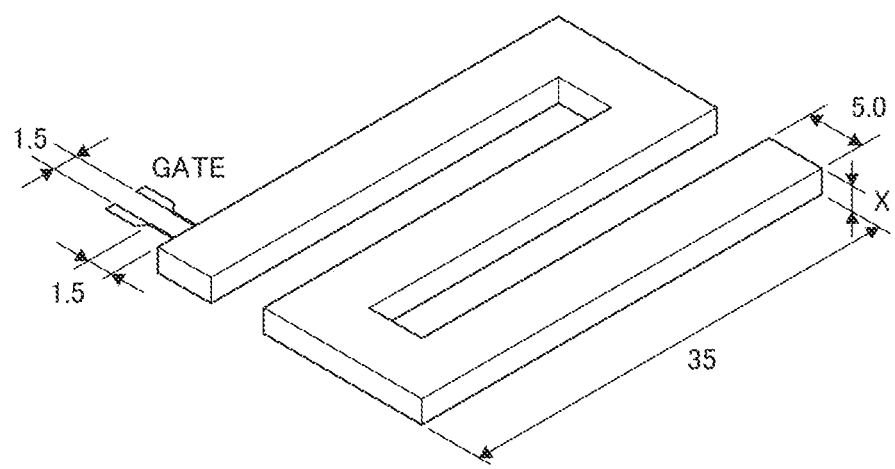

LIQUID CRYSTAL POLYESTER COMPOSITION AND MOLDED BODY

CROSS REFERENCE TO RELATED APPLICATIONS

This application is the U.S. National Phase under 35 U.S.C. § 371 of International Application No. PCT/JP2020/032815, filed on Aug. 31, 2020, which claims the benefit of Japanese Application No. 2019-161354, filed on Sep. 4, 2019, the entire contents of each are hereby incorporated by reference.

TECHNICAL FIELD

The present invention relates to a liquid crystal polyester composition and a molded body.

BACKGROUND ART

Since liquid crystal polyester has excellent melt fluidity and high heat resistance or strength and rigidity, the liquid crystal polyester is suitably used as an injection molding material for manufacturing electrical and electronic parts and is suitably used for manufacturing a connector and the like, for example.

However, a molecular chain of the liquid crystal polyester is easily oriented in a flow direction at the time of molding. Therefore, in a molded body produced from the liquid crystal polyester, there is a problem in that anisotropy of shrinkage rate, expansion rate, and mechanical properties is likely to occur.

To solve such problems, studies have been carried out regarding injection molding with a liquid crystal polyester composition obtained by mixing mica into liquid crystal polyester (for example, see Patent Document 1).

CITATION LIST

Patent Document

[Patent Document 1]
Japanese Unexamined Patent Application, First Publication No. H03-167252

SUMMARY OF INVENTION

Technical Problem

Electrical and electronic parts or mechanical parts have become thinner and more complex in shape with the recent increase in performance or output of equipment, or miniaturization or weight reduction. On the other hand, there is a demand for a molded body having good fluidity of the molding material and further having enhanced mechanical strength, dimensional stability, and surface smoothness (surface properties) of a flow end.

The present invention is made in consideration of these circumstances, and an object thereof is to provide a liquid crystal polyester composition which has good fluidity and with which a molded body having higher tensile strength, dimensional stability, and surface properties can be produced, and a molded body of the liquid crystal polyester composition.

Solution to Problem

In order to solve the aforementioned problems, the present invention includes the following aspects.

<1> A liquid crystal polyester composition, comprising:
a liquid crystal polyester; and
a plate-like inorganic filler,
wherein a ratio (D50/D50*) of median diameters of the plate-like inorganic filler is 3.0 to 6.0,
in which the D50 is a median diameter of the plate-like inorganic filler measured by a laser diffraction method, and
the D50* is a median diameter of the plate-like inorganic filler measured by a centrifugal sedimentation method.

<2> The liquid crystal polyester composition according to <1>,
wherein a content of the plate-like inorganic filler is 10 to 80 parts by mass with respect to 100 parts by mass of the liquid crystal polyester.

<3> The liquid crystal polyester composition according to <1> or <2>,
wherein the plate-like inorganic filler is mica.

<4> The liquid crystal polyester composition according to any one of <1> to <3>,
wherein the D50 of the plate-like inorganic filler is 15 to 40 μm,
in which the D50 is a median diameter measured by a laser diffraction method.

<5> The liquid crystal polyester composition according to any one of <1> to <4>,
wherein a particle size D90 of the plate-like inorganic filler is 40 to 80 μm,
in which the particle size D90 is a particle size value of 90% of a cumulative amount obtained from a volume-based cumulative particle size distribution curve measured by a laser diffraction method.

<6> The liquid crystal polyester composition according to any one of <1> to <5>,
wherein the liquid crystal polyester has a repeating unit (u1) represented by Formula (1), a repeating unit (u2) represented by Formula (2), and a repeating unit (u3) represented by Formula (3), $$—O—Ar^1—CO— \qquad (1)$$

$$—CO—Ar^2—CO— \qquad (2)$$

$$—X—Ar^3—Y— \qquad (3)$$

in Formulae (1) to (3),
$Ar^1$ represents a phenylene group, a naphthylene group, or a biphenylylene group,
$Ar^2$ and $Ar^3$ each independently represents a phenylene group, a naphthylene group, a biphenylylene group, or a group represented by Formula (4),
X and Y each independently represents an oxygen atom or an imino group, and
one or more hydrogen atoms in the group represented by $Ar^1$, $Ar^2$, or $Ar^3$ may be each independently substituted with a halogen atom, an alkyl group having 1 to 28 carbon atoms, or an aryl group having 6 to 12 carbon atoms, $$—Ar^4—Z—Ar^5— \qquad (4)$$

in Formula (4), $Ar^4$ and $Ar^5$ each independently represents a phenylene group or a naphthylene group, and
Z represents an oxygen atom, a sulfur atom, a carbonyl group, a sulfonyl group, or an alkylidene group having 1 to 28 carbon atoms.

<7> A molded body produced by including the liquid crystal polyester composition according to any one of <1> to <6>.

<8> The molded body according to <7>,
wherein a tensile strength of an ASTM No. 4 dumbbell test piece in a tensile test in accordance with ASTM D638 is 125 MPa or more.

<9> The molded body according to <7> or <8>,
wherein the molded body is a connector.

<10> A production method of the molded body according to any one of <7> to <9>, comprising:
molding by melting the liquid crystal polyester composition according to any one of <1> to <6>.

<11> The production method of the molded body according to <10>,
wherein the molding is an injection molding.

The present invention may have the following aspects as one aspect thereof.

One aspect of the present invention is a liquid crystal polyester composition containing a liquid crystal polyester and a plate-like inorganic filler, in which a ratio (D50/D50*) of median diameters of the plate-like inorganic filler is 3.0 to 6.0.

The D50 is a median diameter measured by a laser diffraction method.

The D50* is a median diameter measured by a centrifugal sedimentation method.

In the liquid crystal polyester composition of one aspect of the present invention, a content of the plate-like inorganic filler is preferably 10 to 80 parts by mass with respect to 100 parts by mass of the liquid crystal polyester.

In the liquid crystal polyester composition of one aspect of the present invention, the plate-like inorganic filler is preferably mica.

In the liquid crystal polyester composition of one aspect of the present invention, a particle size D90 of the plate-like inorganic filler is preferably 40 to 80 μm.

The particle size D90 is a particle size value of 90% of a cumulative amount obtained from a volume-based cumulative particle size distribution curve measured by a laser diffraction method.

In the liquid crystal polyester composition of one aspect of the present invention, it is preferable that the above-described liquid crystal polyester have a repeating unit (u1) represented by Formula (1), a repeating unit (u2) represented by Formula (2), and a repeating unit (u3) represented by Formula (3).

  (1)

  (2)

  (3)

In Formulae (1) to (3),
$Ar^1$ represents a phenylene group, a naphthylene group, or a biphenylylene group,
$Ar^2$ and $Ar^3$ each independently represents a phenylene group, a naphthylene group, a biphenylylene group, or a group represented by Formula (4),
X and Y each independently represents an oxygen atom or an imino group, and
one or more hydrogen atoms in the group represented by $Ar^1$, $Ar^2$, or $Ar^3$ may be each independently substituted with a halogen atom, an alkyl group having 1 to 28 carbon atoms, or an aryl group having 6 to 12 carbon atoms.

  (4)

In Formula (4), $Ar^4$ and $Ar^5$ each independently represents a phenylene group or a naphthylene group, and
Z represents an oxygen atom, a sulfur atom, a carbonyl group, a sulfonyl group, or an alkylidene group having 1 to 28 carbon atoms.

In addition, one aspect of the present invention is a molded body produced by including the above-described liquid crystal polyester composition.

The molded body of one aspect of the present invention is preferably a connector.

Advantageous Effects of Invention

According to one aspect of the present invention, a liquid crystal polyester composition which has good fluidity and with which a molded body having higher tensile strength, dimensional stability, and surface properties can be produced is provided.

In addition, according to one aspect of the present invention, it is possible to provide a molded body having higher tensile strength, dimensional stability, and surface properties, and a connector including the molded body.

BRIEF DESCRIPTION OF DRAWINGS

FIG. 1 is a perspective view showing a mold for measuring a thin-walled flow length.

DESCRIPTION OF EMBODIMENTS (Liquid Crystal Polyester Composition)

A liquid crystal polyester composition of the present embodiment is a liquid crystal polyester composition containing a liquid crystal polyester and a plate-like inorganic filler, in which a ratio (D50/D50*) of median diameters of the plate-like inorganic filler is 3.0 to 6.0.

The D50 is a median diameter measured by a laser diffraction method.

The D50* is a median diameter measured by a centrifugal sedimentation method.

<Liquid Crystal Polyester>

The above-described liquid crystal polyester is liquid crystal polyester showing liquid crystalline properties in a melted state. The liquid crystal polyester preferably melts at a temperature equal to or lower than 450° C.

In the present specification, the liquid crystal polyester includes a liquid crystal polyester amide, a liquid crystal polyester ether, a liquid crystal polyester carbonate, and a liquid crystal polyester imide.

The liquid crystal polyester is preferably a wholly aromatic liquid crystal polyester having only a repeating unit derived from an aromatic compound as a raw material monomer.

In the present specification, "derived" means that, in order to polymerize the raw material monomer, a chemical structure of a functional group which contributes to the polymerization changes, but no other structural change occurs.

Typical examples of the liquid crystal polyester include a material obtained by condensation polymerization of aromatic hydroxycarboxylic acid, aromatic dicarboxylic acid, and at least one compound selected from the group consisting of aromatic diol, aromatic hydroxyamine, and aromatic diamine, a material obtained by polymerization of plural kinds of aromatic hydroxycarboxylic acid, a material obtained by polymerization of aromatic dicarboxylic acid and at least one compound selected from the group consisting of aromatic diol, aromatic hydroxyamine, and aromatic diamine, and a material obtained by polymerization of polyester such as polyethylene terephthalate and aromatic hydroxycarboxylic acid.

Here, regarding aromatic hydroxycarboxylic acid, aromatic dicarboxylic acid, aromatic diol, aromatic hydroxyamine, and aromatic diamine, polymerizable derivatives thereof may be each independently used instead of a part or the entirety thereof.

Examples of a polymerizable derivative of a compound including a carboxy group such as aromatic hydroxycarboxylic acid and aromatic dicarboxylic acid include a material obtained by converting a carboxy group into an alkoxycarbonyl group or an acyloxycarbonyl group (ester), a material obtained by converting a carboxy group into a haloformyl group (acid halide), and a material obtained by converting a carboxy group into an acyloxycarbonyl group (acid anhydride).

As an example of a polymerizable derivative of a compound including a hydroxy group such as aromatic hydroxycarboxylic acid, aromatic diol, or aromatic hydroxyamine, a material obtained by acylating a hydroxy group to convert it into an acyloxy group (acylated product) is used.

As an example of a polymerizable derivative of a compound including an amino group such as aromatic hydroxyamine and aromatic diamine, a material obtained by acylating an amino group to convert it into an acylamino group (acylated product) is used.

The liquid crystal polyester preferably has a repeating unit (u1) represented by Formula (1) (hereinafter, referred to as a "repeating unit (u1)"), and more preferably has the repeating unit (u1), a repeating unit (u2) represented by Formula (2) (hereinafter, referred to as a "repeating unit (u2)"), and a repeating unit (u3) represented by Formula (3) (hereinafter, referred to as a "repeating unit (u3)").

  (1)

  (2)

  (3)

In Formulae (1) to (3),
Ar¹ represents a phenylene group, a naphthylene group, or a biphenylylene group,
Ar² and Ar³ each independently represents a phenylene group, a naphthylene group, a biphenylylene group, or a group represented by Formula (4),
X and Y each independently represents an oxygen atom or an imino group (—NH—), and
one or more hydrogen atoms in the group represented by Ar¹, Ar², or Ar³ may be each independently substituted with a halogen atom, an alkyl group having 1 to 28 carbon atoms, or an aryl group having 6 to 12 carbon atoms.

  (4)

In Formula (4), Ar⁴ and Ar⁵ each independently represents a phenylene group or a naphthylene group, and
Z represents an oxygen atom, a sulfur atom, a carbonyl group, a sulfonyl group, or an alkylidene group having 1 to 28 carbon atoms.

Examples of the above-described halogen atom which can be substituted with the hydrogen atom include a fluorine atom, a chlorine atom, a bromine atom, and an iodine atom.

Examples of the alkyl group having 1 to 28 carbon atoms which can be substituted with the hydrogen atom include a methyl group, an ethyl group, an n-propyl group, an isopropyl group, an n-butyl group, an isobutyl group, a sec-butyl group, a tert-butyl group, an n-hexyl group, a 2-ethylhexyl group, an n-octyl group, and an n-decyl group. The number of carbon atoms in the above-described alkyl group is preferably 1 to 10.

Examples of the aryl group having 6 to 12 carbon atoms which can be substituted with the hydrogen atom include monocyclic aromatic groups such as a phenyl group, an o-tolyl group, an m-tolyl group, and a p-tolyl group, and condensed aromatic groups such as a 1-naphthyl group and a 2-naphthyl group.

In a case where one or more hydrogen atoms in the group represented by Ar¹, Ar², or Ar³ are substituted with these groups, the number of substitutions is preferably 1 or 2 for each group represented by Ar¹, Ar², or Ar³, each independently, and more preferably 1.

Examples of the alkylidene group having 1 to 28 carbon atoms include a methylene group, an ethylidene group, an isopropylidene group, an n-butylidene group, and a 2-ethylhexylidene group. The number of carbon atoms in the above-described alkylidene group is preferably 1 to 10.

The repeating unit (u1) is a repeating unit derived from a predetermined aromatic hydroxycarboxylic acid. As the repeating unit (u1), a repeating unit in which Ar¹ is a 1,4-phenylene group (repeating unit derived from p-hydroxybenzoic acid), or a repeating unit in which Ar¹ is a 2,6-naphthylene group (repeating unit derived from 6-hydroxy-2-naphthoic acid) is preferable.

The repeating unit (u2) is a repeating unit derived from a predetermined aromatic dicarboxylic acid. As the repeating unit (u2), a repeating unit in which Ar² is a 1,4-phenylene group (repeating unit derived from terephthalic acid), a repeating unit in which Ar² is a 1,3-phenylene group (repeating unit derived from isophthalic acid), a repeating unit in which Ar² is a 2,6-naphthylene group (repeating unit derived from 2,6-naphthalenedicarboxylic acid), or a repeating unit in which Ar² is a diphenyl ether-4,4'-diyl group (repeating unit derived from diphenyl ether-4,4'-dicarboxylic acid) is preferable.

The repeating unit (u3) is a repeating unit derived from a predetermined aromatic diol, aromatic hydroxyamine, or aromatic diamine. As the repeating unit (u3), a repeating unit in which Ar³ is a 1,4-phenylene group (repeating unit derived from hydroquinone, p-aminophenol, or p-phenylenediamine), or a repeating unit in which Ar³ is a 4,4'-biphenylylene group (repeating unit derived from 4,4'-dihydroxybiphenyl, 4-amino-4'-hydroxybiphenyl, or 4,4'-diaminobiphenyl) is preferable.

A content of the repeating unit (u1) in the liquid crystal polyester is preferably equal to or greater than 30 mol %, more preferably 30 to 80 mol %, even more preferably 40 to 70 mol %, and particularly preferably 45 to 65 mol % with respect to a total amount of all repeating units constituting the liquid crystal polyester (value obtained by adding up a substance amount equivalent (mol) of each repeating unit, which is obtained by dividing mass of each repeating unit constituting the liquid crystal polyester by formula weight of each repeating unit). In the liquid crystal polyester, as the content of the repeating unit (u1) becomes higher, melt fluidity, heat resistance, and strength and rigidity are easily improved. In a case where the content is equal to or smaller than 80 mol %, melting temperature or melting viscosity is unlikely to increase, and the temperature required for molding can be lowered.

A content of the repeating unit (u2) in the liquid crystal polyester is preferably equal to or smaller than 35 mol %, more preferably 10 to 35 mol %, even more preferably 15 to 30 mol %, and particularly preferably 17.5 to 27.5 mol % with respect to the total amount of all repeating units constituting the liquid crystal polyester.

A content of the repeating unit (u3) in the liquid crystal polyester is preferably equal to or smaller than 35 mol %, more preferably 10 to 35 mol %, even more preferably 15 to 30 mol %, and particularly preferably 17.5 to 27.5 mol % with respect to the total amount of all repeating units constituting the liquid crystal polyester.

The sum of the content of the repeating unit (u1) in the liquid crystal polyester, the content of the repeating unit (u2) in the liquid crystal polyester, and the content of the repeating unit (u3) in the liquid crystal polyester does not exceed 100 mol %.

In the liquid crystal polyester, a proportion of the content of the repeating unit (u2) to the content of the repeating unit (u3) is shown as [content of repeating unit (u2)]/[content of repeating unit (u3)] (mol/mol), and is preferably 0.9/1 to 1/0.9, more preferably 0.95/1 to 1/0.95, and even more preferably 0.98/1 to 1/0.98.

The liquid crystal polyester may include one or more kinds of the repeating units (u1) to (u3) each independently.

The liquid crystal polyester may include one or more kinds of repeating units other than the repeating units (u1) to (u3), and the content thereof is preferably 0 to 10 mol % and more preferably 0 to 5 mol % with respect to the total amount of all repeating units.

The liquid crystal polyester preferably includes, as the repeating unit (u3), a repeating unit in which X and Y each represents an oxygen atom. In the repeating unit (u3), having X and Y each being an oxygen atom may mean having a repeating unit derived from aromatic diol mentioned below. This configuration is preferable because melting viscosity of the liquid crystal polyester easily decreases. It is more preferable that only a repeating unit in which X and Y each represents an oxygen atom be included as the repeating unit (u3).

The liquid crystal polyester is preferably produced by causing melt polymerization of a raw material monomer corresponding to the repeating unit constituting the liquid crystal polyester, and causing solid phase polymerization of the obtained polymer (hereinafter, may be referred to as a "prepolymer"). As a result, it is possible to produce high-molecular-weight liquid crystal polyester having high heat resistance, strength, and rigidity with excellent operability.

The melt polymerization may be performed under the presence of a catalyst, and examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino) pyridine and 1-methylimidazole. As the above-described catalyst, the nitrogen-containing heterocyclic compound is preferable.

A flow start temperature of the liquid crystal polyester defined below is preferably equal to or higher than 270° C., more preferably 270° C. to 400° C., and even more preferably 280° C. to 400° C. As the flow start temperature becomes higher, heat resistance or strength and rigidity of the liquid crystal polyester are easily improved, and thus, the flow start temperature is preferably equal to or higher than 270° C. In a case where the flow start temperature is equal to or lower than 400° C., an excessively high temperature is not required for melting, thermal deterioration during molding is prevented, a viscosity during melting is lowered, and the fluidity of the liquid crystal polyester composition can be improved.

The flow start temperature is also referred to as a flow temperature, is a temperature indicating a viscosity of 4,800 Pa·s (48,000 poise), in a case where the liquid crystal polyester is melted while increasing the temperature at a rate of 4° C./min under a load of 9.8 MPa (100 kg/cm$^2$) by using a capillary rheometer and extruded from a nozzle having an inner diameter of 1 mm and a length of 10 mm, and is a measure of the molecular weight of the liquid crystal polyester.

The liquid crystal polyester included in the liquid crystal polyester composition may be one or more kinds.

In a case where the liquid crystal polyester composition includes two or more kinds of liquid crystal polyesters, it is preferable to include a liquid crystal polyester (A) and a liquid crystal polyester (B) having different flow start temperatures.

A flow start temperature of the liquid crystal polyester (A) is preferably 310° C. to 400° C., more preferably 320° C. to 400° C., and even more preferably 330° C. to 400° C. By setting the flow start temperature to be equal to or higher than the above-described lower limit value, heat resistance of the liquid crystal polyester (A) further increases.

A flow start temperature of the liquid crystal polyester (B) is preferably 270° C. to 370° C., more preferably 280° C. to 370° C., even more preferably 280° C. to 320° C., and particularly preferably 290° C. or higher and lower than 310° C. In another aspect, the flow start temperature of the liquid crystal polyester (B) may be 300° C. to 370° C. By setting the flow start temperature to be equal to or higher than the above-described lower limit value, heat resistance of the liquid crystal polyester (B) further increases.

The flow start temperature of the liquid crystal polyester (A) is higher than the flow start temperature of the liquid crystal polyester (B), and a difference between the flow start temperature of the liquid crystal polyester (A) and the flow start temperature of the liquid crystal polyester (B) is preferably 10° C. to 60° C., more preferably 20° C. to 60° C., and even more preferably 25° C. to 60° C. By setting the difference between the flow start temperatures to be within such a range, thin-wall fluidity of the liquid crystal polyester composition further increases, and molding workability is also further improved.

A content of the liquid crystal polyester (B) in the above-described liquid crystal polyester composition is preferably 10 to 200 parts by mass, more preferably 10 to 150 parts by mass, and even more preferably 10 to 120 parts by mass with respect to 100 parts by mass of the content of the liquid crystal polyester (A). By setting the content of the liquid crystal polyester (B) to be within such a range, thin-wall fluidity of the liquid crystal polyester composition further increases, and molding workability is also further improved.

In a case where the above-described liquid crystal polyester composition includes any one or both of the liquid crystal polyester (A) and the liquid crystal polyester (B), the liquid crystal polyester composition may include or may not include liquid crystal polyester other than those. It is more preferable that the liquid crystal polyester other than the liquid crystal polyester (A) and the liquid crystal polyester (B) not be included in the above-described liquid crystal polyester composition.

For example, in a case where the above-described liquid crystal polyester composition includes any one or both of the liquid crystal polyester (A) and the liquid crystal polyester (B), both the liquid crystal polyester (A) and the liquid crystal polyester (B) may be one or more kinds. The liquid crystal polyester other than the liquid crystal polyester (A)

and the liquid crystal polyester (B), included in the above-described liquid crystal polyester composition, may also be one or more kinds.

A content of the liquid crystal polyester in the above-described liquid crystal polyester composition is preferably 30 to 95 mass %, more preferably 40 to 90 mass %, and even more preferably 50 to 85 mass % with respect to a total mass of the liquid crystal polyester composition. By setting the content of the liquid crystal polyester to be within such a range, the above-described preferred properties of the liquid crystal polyester are satisfactorily exhibited.

<Plate-Like Inorganic Filler>

The plate-like inorganic filler contained in the liquid crystal polyester composition of the present embodiment is a plate-like inorganic filler having a specific median diameter ratio. That is, regarding the plate-like inorganic filler, a ratio (D50/D50*) of a median diameter D50 measured by a laser diffraction method and a median diameter D50* measured by a centrifugal sedimentation method is 3.0 to 6.0. From the viewpoint that the effects of the present invention are further enhanced, the ratio (D50/D50*) is preferably 3.5 to 6.0, more preferably 4.0 to 6.0, and even more preferably 5.0 to 5.4.

In a case where the ratio (D50/D50*) is within the above-described range, the fluidity of the liquid crystal polyester composition is good, and a molded body having higher tensile strength, dimensional stability, and surface properties is obtained. In addition, in a case where the ratio (D50/D50*) is equal to or smaller than the upper limit value of the above-described range, particularly, the fluidity of the liquid crystal polyester composition is good, and a molded body having higher tensile strength is easily obtained.

In a case where the ratio (D50/D50*) is within the above-described range, since a shape such as a thickness of the plate-like inorganic filler is suitable, the thickness is within a range in which the plate-like inorganic filler can be stably oriented in a flow direction, and a surface of the plate-like inorganic filler has irregularities which easily exhibit an anchor effect, it is considered that the above-described effects can be easily obtained.

The D50 is a median diameter measured by a laser diffraction method. The D50 of the plate-like inorganic filler is calculated as follows.

For example, the liquid crystal polyester composition is heat-treated (ashed) to completely remove a resin component, thereby recovering the plate-like inorganic filler. Alternatively, the plate-like inorganic filler is produced by pulverizing a mined raw material, or the like. Next, the plate-like inorganic filler is uniformly dispersed in water to prepare an aqueous dispersion (slurry) of the plate-like inorganic filler. A concentration of the plate-like inorganic filler in the aqueous dispersion may be appropriately set according to the type of the plate-like inorganic filler, and is, for example, 1 to 10 mass %.

Regarding the aqueous dispersion (slurry), a volume-based particle size distribution is measured in accordance with JIS R 1629 using a laser diffraction type particle size distribution measuring device. The D50 can be calculated from a particle size value of 50% of a cumulative amount read from a cumulative particle size distribution curve based on the measurement of the particle size distribution.

The median diameter D50 in the plate-like inorganic filler contained in the liquid crystal polyester composition of the present embodiment is preferably 15 to 40 µm, more preferably 20 to 35 µm, and even more preferably 20 to 25 µm.

In addition, a particle size D90 of the plate-like inorganic filler contained in the liquid crystal polyester composition of the present embodiment is preferably equal to or greater than 40 µm, more preferably 40 to 80 µm, even more preferably 40 to 70 µm, and particularly preferably 40 to 50 µm. In addition, as another aspect, the particle size D90 of the plate-like inorganic filler contained in the liquid crystal polyester composition of the present embodiment is preferably equal to or smaller than 70 µm, more preferably 30 to 70 µm, even more preferably 35 to 60 µm, and particularly preferably 40 to 45 µm. In a case where the particle size D90 is within the above-described preferred range, a molded body having excellent impact resistance characteristics is easily obtained.

In addition, from the viewpoint of dimensional stability, the particle size D90 is preferably 40 to 80 µm and more preferably 70 to 75 µm.

The particle size D90 of the plate-like inorganic filler is calculated as follows. For example, regarding the above-described aqueous dispersion (slurry), a volume-based particle size distribution is measured in accordance with JIS R 1629 using a laser diffraction type particle size distribution measuring device. The particle size D90 can be calculated from a particle size value of 90% of a cumulative amount from a fine particle side read from a cumulative particle size distribution curve based on the measurement of the particle size distribution.

The D50* is a median diameter measured by a centrifugal sedimentation method. The D50* of the plate-like inorganic filler is calculated as follows.

For example, the liquid crystal polyester composition is heat-treated (ashed) to completely remove a resin component, thereby recovering the plate-like inorganic filler. Alternatively, the plate-like inorganic filler is produced by pulverizing a mined raw material, or the like. Next, the plate-like inorganic filler is dispersed in water to prepare an aqueous dispersion (slurry) of the plate-like inorganic filler. A concentration of the plate-like inorganic filler in the aqueous dispersion may be appropriately set according to the type of the plate-like inorganic filler, and is, for example, 1 to 10 mass % with respect to 100 mass % of a total mass of the aqueous dispersion.

Regarding the aqueous dispersion (slurry), a mass-based particle size distribution is measured in accordance with JIS R 1619 using a centrifugal sedimentation type particle size distribution measuring device. The D50* can be calculated from a particle size value of 50% of a cumulative amount read from a cumulative particle size distribution curve based on the measurement of the particle size distribution.

The median diameter D50* in the plate-like inorganic filler contained in the liquid crystal polyester composition of the present embodiment is preferably 2.5 to 7.0 µm, more preferably 3.0 to 7.0 µm, even more preferably 3.5 to 6.0 µm, and particularly preferably 3.5 to 5.0 µm.

Regarding measurement of each particle size distribution by a laser diffraction method and centrifugal sedimentation method:

In the laser diffraction method, a laser beam is applied to the slurry containing the plate-like inorganic filler, and the particle size distribution is measured by a degree of diffraction (scattered light). The particle size of the measured particle, which shows the same pattern of diffracted/scattered light as a spherical particle having a diameter of 1 µm, is 1 µm regardless of its shape. In the centrifugal sedimentation method, the slurry containing the plate-like inorganic filler is subjected to centrifugation, light is applied to the slurry in a centrifugally separated state, and the particle size distribution is measured by transition of light transmittance. The particle size of the measured particle having the same sedimentation rate as the spherical particle having the same substance as the measured particle and having a diameter of 1 μm is 1 μm. Compared with the laser diffraction method, the centrifugal sedimentation method reflects an influence of the shape of the particles to be measured.

Therefore, the ratio (D50/D50*) of the median diameters specified in the present embodiment does not depend only on the size of the particle size of the plate-like inorganic filler, but also is a parameter which also reflects the influence of its shape (thickness and the like).

It is considered that, as the value of D50* becomes smaller, the particles to be measured have a shape (for example, a thin-plate shape or a small particle size) which is difficult to settle.

In the liquid crystal polyester composition containing the liquid crystal polyester and the plate-like inorganic filler, it is not suitable for the ratio (D50/D50*) to be high or low, and in a case where the ratio (D50/D50*) is within a specific range of 3.0 to 6.0, the fluidity of the liquid crystal polyester composition and the tensile strength, dimensional stability, and surface properties of the molded body are all enhanced.

Here, "plate-like" of the plate-like inorganic filler means that the long side (length indicated by a straight line connecting two most distant points on a contour line of a main surface) of a main surface (surface having the largest area) of the inorganic filler is larger than the thickness (length indicated by a straight line connecting two points on the surface of the most distant plate-like inorganic filler in a direction perpendicular to the main surface) of the inorganic filler.

The plate-like inorganic filler is not limited as long as the conditions described above are satisfied, and examples thereof include mica, graphite, wollastonite, glass flake, barium sulfate, and calcium carbonate. Among the examples described above, the plate-like inorganic filler is preferably mica.

Mica may be muscovite, phlogopite, fluorophlogopite, or tetrasilicic mica.

The ratio (D50/D50*) of the median diameters specified in the present embodiment can be controlled by, for example, the type, shape, and the like of the plate-like inorganic filler.

For example, in a case where mica is used as the plate-like inorganic filler, the place of production, production conditions, and the like of a raw material may be appropriately selected.

A method for producing the plate-like inorganic filler contained in the liquid crystal polyester composition of the present embodiment may be any method as long as a plate-like inorganic filler satisfying the above-described ratio of median diameters can be obtained, and pulverization and classification may be carried out by a dry method or a wet method. However, a wet method is preferable in that a plate-like inorganic filler having a preferred form can be easily obtained. Examples of the method for producing the plate-like inorganic filler include a method of mechanically pulverizing a plate-like inorganic filler raw material and then classifying the raw material, and after the classification or before the classification, an acid treatment, a heat treatment, or a combined treatment of the acid treatment and the heat treatment may be performed. By the acid treatment and/or the heat treatment, for example, in the case of mica, layer peeling is promoted, and a plate-like inorganic filler satisfying the above-described ratio of median diameters can be easily obtained.

The plate-like inorganic filler may be used alone or in combination of two or more kinds thereof.

The content of the above-described plate-like inorganic filler in the above-described liquid crystal polyester composition is preferably 10 to 80 parts by mass, more preferably 15 to 60 parts by mass, even more preferably 20 to 55 parts by mass, and particularly preferably 25 to 50 parts by mass with respect to 100 parts by mass of the above-described liquid crystal polyester. From another aspect, the content of the above-described plate-like inorganic filler in the above-described liquid crystal polyester composition is preferably 5 to 50 parts by mass, more preferably 10 to 45 parts by mass, and even more preferably 15 to 30 parts by mass with respect to 100 parts by mass of the above-described liquid crystal polyester.

In a case where the content of the plate-like inorganic filler is equal to or greater than the lower limit value of the above-described preferred range, a molded body obtained by molding the above-described liquid crystal polyester composition has higher mechanical strength, dimensional stability, and heat resistance. On the other hand, in a case of being equal to or smaller than the upper limit value of the above-described preferred range, the fluidity of the liquid crystal polyester composition, the surface smoothness (surface properties) of the flow end of the molded body, and the impact resistance are further improved.

<Other Components>

The above-described liquid crystal polyester composition may include a component other than the above-described liquid crystal polyester and plate-like inorganic filler. Examples of the other components include an inorganic filler other than the above-described plate-like inorganic filler and additives.

The other components may be used alone or in combination of two or more kinds thereof.

Examples of the inorganic filler other than the plate-like inorganic filler include a fibrous inorganic filler and a particulate inorganic filler.

Examples of the fibrous inorganic filler include a glass fiber; a carbon fiber such as a pan-based carbon fiber and a pitch-based carbon fiber; a ceramic fiber such as a silica fiber, an alumina fiber, and a silica alumina fiber; and a metal fiber such as a stainless steel fiber. Examples of the fibrous inorganic filler include whiskers such as potassium titanate whiskers, barium titanate whiskers, wollastonite whiskers, aluminum borate whiskers, silicon nitride whiskers, and silicon carbide whiskers.

Examples of the particulate inorganic filler include silica, alumina, titanium oxide, glass beads, a glass balloon, boron nitride, silicon carbide, and calcium carbonate.

In the above-described liquid crystal polyester composition, the content of the inorganic filler other than the plate-like inorganic filler is preferably 0 to 50 parts by mass with respect to 100 parts by mass of the liquid crystal polyester.

Examples of the additive include an antioxidant, a thermal stabilizer, an ultraviolet absorber, an antistatic agent, a surfactant, a flame retardant, and a colorant.

The content of the additive in the liquid crystal polyester composition is preferably 0 to 5 parts by mass with respect to 100 parts by mass of the liquid crystal polyester.

Method for Producing Liquid Crystal Polyester Composition:

The above-described liquid crystal polyester composition is obtained, for example, by mixing the above-described liquid crystal polyester, plate-like inorganic filler, and other components as necessary, collectively or in an appropriate order. A mixing method in this case is not particularly limited, and a mixing method using a known stirring device such as a tumbler mixer or a Henschel mixer is used.

In addition, a pelletized material obtained by melting and kneading of the obtained mixture by using an extruder or the like and extruding the kneaded product in a strand shape may be set as the above-described liquid crystal polyester composition.

The above-described extruder preferably has a cylinder, one or more screws arranged in the cylinder, and one or more supply ports provided in the cylinder, and it is more preferable that the extruder be further provided with one or more vent portions in the cylinder.

The temperature during melting and kneading is not particularly limited, and is preferably 200° C. to 400° C. and more preferably 250° C. to 370° C.

(Molded Body)

A molded body of the present embodiment is a molded body produced by including the above-described liquid crystal polyester composition.

The molded body of the present embodiment is obtained by molding the above-described liquid crystal polyester composition. As a method of molding the above-described liquid crystal polyester composition, a melt molding method is preferable, and examples of the melt molding method include an injection molding method; an extrusion molding method such as a T-die method and an inflation method; a compression molding method; a blow molding method; a vacuum molding method; and a press molding method. Among these, the molding method of the above-described composition is preferably an injection molding method.

As one embodiment of the present invention, a production method of the molded body, including molding by melting (melt molding) the liquid crystal polyester composition of the embodiment, is provided. The above-described molding is preferably an injection molding (injection molding method).

Molding conditions of the above-described liquid crystal polyester composition are not particularly limited and suitably selected in accordance with the molding method. For example, in a case of performing the molding by an injection molding method, the molding may be performed by setting a cylinder temperature of an injection molding machine to be preferably 250° C. to 400° C. and a mold temperature to be preferably 20° C. to 180° C.

Since the above-described liquid crystal polyester composition is used in the molded body of the present embodiment, tensile strength is further increased. For example, in a case where an ASTM No. 4 dumbbell test piece as will be described later in Examples is produced as the molded body of the present embodiment, a tensile strength of the test piece in a case where a tensile test is performed in accordance with ASTM D638 is preferably equal to or greater than 125 MPa and more preferably equal to or greater than 130 MPa.

The upper limit value of the above-described tensile strength is not particularly limited, but in a case where an ASTM No. 4 dumbbell test piece as will be described later in Examples is produced as the molded body of the present embodiment, a tensile strength of the test piece in a case where a tensile test is performed in accordance with ASTM D638 may be equal to or smaller than 160 MPa, equal to or smaller than 155 MPa, or equal to or smaller than 150 MPa.

The upper limit value and lower limit value of the numerical range of the tensile strength mentioned above can be freely combined. In a case where the ASTM No. 4 dumbbell test piece as will be described later in Examples is produced as the molded body of the present embodiment, the tensile strength of the test piece in a case where the tensile test is performed in accordance with ASTM D638 may be equal to or greater than 125 MPa and equal to or smaller than 160 MPa, equal to or greater than 125 MPa and equal to or smaller than 155 MPa, or equal to or greater than 130 MPa and equal to or smaller than 150 MPa.

In the liquid crystal polyester composition of the present embodiment, for example, the fluidity is enhanced by selecting the type of the plate-like inorganic filler. For example, in a case where the liquid crystal polyester composition of the present embodiment is molded by an injection molding machine using a mold for measuring the thin-walled flow length as will be described later in Examples, an average value of the length (0.2 mmt flow length) from a gate opening to a flow end portion in the flow direction of the resin can be increased, and a difference (variation) between the maximum value and the minimum value can be reduced.

In addition, since the above-described liquid crystal polyester composition is used in the molded body of the present embodiment, the surface smoothness (surface properties) of the flow end of the molded body produced by the injection molding is further enhanced. For example, as the molded body of the present embodiment, in a width direction (5 mm width direction in FIG. 1) of a surface of the flow end portion of the molded body, which is molded in a case of measuring the thickness 0.2 mmt flow length as will be described later in Examples, a surface roughness (arithmetic mean roughness Ra) of the flow end portion can be suppressed to be preferably equal to or smaller than 0.60 μm, more preferably equal to or smaller than 0.50 μm, and even more preferably equal to or smaller than 0.40 μm. The flow end portion refers to an end portion of the molded body itself of the liquid crystal polyester composition.

The lower limit value of the above-described surface roughness (arithmetic mean roughness Ra) is not particularly limited, but as the molded body of the present embodiment, in the width direction of the surface of the flow end portion of the molded body, which is molded in a case of measuring the thickness 0.2 mmt flow length as will be described later in Examples, the surface roughness (arithmetic mean roughness Ra) of the flow end portion may be equal to or greater than 0.10 μm, equal to or greater than 0.15 μm, or equal to or greater than 0.20 μm.

The upper limit value and lower limit value of the numerical range of the arithmetic mean roughness Ra mentioned above can be freely combined. As the molded body of the present embodiment, in the width direction of the surface of the flow end portion of the molded body, which is molded in a case of measuring the thickness 0.2 mmt flow length as will be described later in Examples, the surface roughness (arithmetic mean roughness Ra) of the flow end portion may be equal to or greater than 0.10 μm and equal to or smaller than 0.60 μm, equal to or greater than 0.15 μm and equal to or smaller than 0.50 μm, or equal to or greater than 0.20 μm and equal to or smaller than 0.40 μm.

In addition, since the above-described liquid crystal polyester composition is used in the molded body of the present embodiment, bending strength is further increased. For example, in a case where a rod-like test piece having a width of 12.7 mm, a length of 127 mm, and a thickness of 6.4 mm as will be described later in Examples is produced as the molded body of the present embodiment, the bending strength of the test piece in a case where a bending test is performed in accordance with ASTM D790 is preferably equal to or greater than 120 MPa, more preferably equal to or greater than 125 MPa, even more preferably equal to or greater than 130 MPa, particularly preferably equal to or greater than 135 MPa, and more particularly preferably equal to or greater than 138 MPa.

In addition, since the above-described liquid crystal polyester composition is used in the molded body of the present embodiment, bending modulus is further increased. For example, in a case where a rod-like test piece having a width of 12.7 mm, a length of 127 mm, and a thickness of 6.4 mm as will be described later in Examples is produced as the molded body of the present embodiment, the bending modulus of the test piece in a case where a bending test is performed in accordance with ASTM D790 is preferably greater than 8.0 GPa, more preferably equal to or greater than 9.0 GPa, even more preferably equal to or greater than 9.5 GPa, and particularly preferably equal to or greater than 10.0 GPa.

In addition, since the above-described liquid crystal polyester composition is used in the molded body of the present embodiment, dimensional stability is further increased. For example, in a case where a 64 mm×64 mm×3 mmt flat plate-like test piece as will be described later in Examples is produced as the molded body of the present embodiment under predetermined injection molding conditions, the sum of a shrinkage rate of MD and a shrinkage rate of TD can be suppressed to be small, and the sum can be suppressed to be preferably equal to or smaller than 1.25%, more preferably equal to or smaller than 1.00%, even more preferably equal to or smaller than 0.95%, and particularly preferably equal to or smaller than 0.90%.

In addition, the molded body of the present embodiment has high heat resistance by selecting the type of the liquid crystal polyester, for example. For example, in a case a rod-like test piece having a width of 12.7 mm, a length of 127 mm, and a thickness of 6.4 mm as will be described later in examples is produced as the molded body of the present embodiment, a deflection temperature under load of the test piece in a case where the measurement is performed under the conditions of a load of 1.82 MPa and a rate of temperature increase of 2° C./min in accordance with ASTM D648 is preferably equal to or higher than 235° C., more preferably equal to or higher than 240° C., and can also be, for example, equal to or higher than 250° C. or equal to or higher than 260° C.

Examples of a product, equipment, a component, or a member constituting the molded body of the present embodiment include a bobbin such as an optical pickup bobbin and a transformer bobbin; a relay component such as a relay case, a relay base, a relay sprue, and a relay armature; a connector such as a RIMM, a DDR, a CPU socket, a S/O, a DIMM, a Board-to-Board connector, an FPC connector, and a card connector; a reflector such as a lamp reflector and an LED reflector; a holder such as a lamp holder and a heater holder; a diaphragm such as a speaker diaphragm; a separation claw such as a separation claw for a copier and a separation claw for a printer; a camera module component; a switch component; a motor component; a sensor component; a hard disk drive component; tableware such as ovenware; a car component; a battery component; an aircraft part; and a sealing member such as a sealing member for a semiconductor element and a sealing member for coil.

Among these, the molded body of the present embodiment is preferably a connector and is more preferably a connector obtained by performing the molding by the injection molding method.

Here, the connector mainly indicates equipment used for connection between members such as electronic equipment, or a member used at the connected portion of the equipment, and particularly indicates the member used for connection between wires such as cords of electronic equipment. A shape of the connector is not particularly limited, and may be a long shape, a plate shape, or the like.

EXAMPLES

Hereinafter, the present invention will be described in more detail with reference to specific examples. However, the present invention is not limited to the examples shown below.

[Measurement Method of Flow Start Temperature of Liquid Crystal Polyester]

Using a flow tester ("CFT-500 type" manufactured by Shimadzu Corporation), approximately 2 g of a liquid crystal polyester was filled into a cylinder equipped with a die having a nozzle with an inner diameter of 1 mm and a length of 10 mm. Next, the liquid crystal polyester was melted and extruded from the nozzle while the temperature was increased at a rate of 4° C./minute under a load of 9.8 MPa (100 kg/cm$^2$) to measure the temperature (flow start temperature) indicating a viscosity of 4,800 Pa·s (48,000 poise), and the temperature was used as a flow start temperature of the liquid crystal polyester.

<Production of Liquid Crystal Polyester>

Production Example 1: Production of Liquid Crystal Polyester (L1)

994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, and 1347.6 g (13.2 mol) of acetic anhydride were put into a reaction vessel including a stirring device, a torque meter, a nitrogen gas introduction pipe, a thermometer, and a reflux condenser, gas in the reaction vessel was replaced with nitrogen gas, 0.18 g of 1-methylimidazole was added thereto, the temperature was increased from room temperature to 150° C. over 30 minutes while stirring under a nitrogen gas flow, and reflux was performed at 150° C. for 30 minutes.

Next, 2.4 g of 1-methylimidazole was added thereto, the temperature was increased from 150° C. to 320° C. over 2 hours and 50 minutes while distilling byproduct acetic acid and unreacted acetic anhydride, the content was extracted from the reaction vessel and cooled to room temperature, at the time point when an increase in torque was recognized, and a prepolymer which is a solid matter was obtained.

Next, the prepolymer was pulverized by a pulverizer, the obtained pulverized material was heated from room temperature to 250° C. over 1 hour under a nitrogen atmosphere, further heated from 250° C. to 295° C. over 5 hours, and held at 295° C. for 3 hours, thereby performing solid phase polymerization.

The obtained solid-phase polymer was cooled to room temperature and a powder-like liquid crystal polyester (L1) was obtained. The flow start temperature of the liquid crystal polyester (L1) was 327° C.

Production Example 2: Production of Liquid Crystal Polyester (L2)

994.5 g (7.2 mol) of p-hydroxybenzoic acid, 239.2 g (1.44 mol) of terephthalic acid, 159.5 g (0.96 mol) of isophthalic acid, 446.9 g (2.4 mol) of 4,4'-dihydroxybiphenyl, and 1347.6 g (13.2 mol) of acetic anhydride were put into a reaction vessel including a stirring device, a torque meter, a nitrogen gas introduction pipe, a thermometer, and a reflux condenser, gas in the reaction vessel was replaced with nitrogen gas, 0.18 g of 1-methylimidazole was added thereto, the temperature was increased from room temperature to 150° C. over 30 minutes while stirring under a nitrogen gas flow, and reflux was performed at 150° C. for 30 minutes.

Next, 2.4 g of 1-methylimidazole was added thereto, the temperature was increased from 150° C. to 320° C. over 2 hours and 50 minutes while distilling byproduct acetic acid and unreacted acetic anhydride, the content was extracted from the reaction vessel and cooled to room temperature, at the time point when an increase in torque was recognized, and a prepolymer which is a solid matter was obtained.

Next, the prepolymer was pulverized by a pulverizer, the obtained pulverized material was heated from room temperature to 220° C. over 1 hour under a nitrogen atmosphere, further heated from 220° C. to 240° C. over 30 minutes, and held at 240° C. for 10 hours, thereby performing solid phase polymerization.

The obtained solid-phase polymer was cooled to room temperature and a powder-like liquid crystal polyester (L2) was obtained. The flow start temperature of the liquid crystal polyester (L2) was 286° C.

<Plate-Like Inorganic Filler>

Plate-like inorganic fillers used in Examples and Comparative Examples are shown below.

Plate-like inorganic filler (F1): mica, "KT-25" manufactured by HADANO-MICA.
Plate-like inorganic filler (F2): mica, obtained in Production Example 3 below
Plate-like inorganic filler (F3): mica, "GM-8" manufactured by Chuzhou Grea Minerals. co., Ltd.
Plate-like inorganic filler (F4): mica, obtained in Production Example 4 below
Plate-like inorganic filler (F5): mica, obtained in Production Example 5 below
Plate-like inorganic filler (F6): mica, "J-31M" manufactured by YAMAGUCHI MICA CO., LTD.

Production Example 3: Production of Plate-like Inorganic Filler (F2)

Mica raw material (muscovite, flake of approximately 10 to 30 mm) produced in Bihar, India was finely pulverized with a wet pulverizer and then wet-classified using a 150-mesh sieve. The classified sample was immersed in a citric acid solution adjusted to pH 3.0 for 1 day, and then stirred for approximately 1 hour. The supernatant was repeatedly classified by decantation and neutralized with ammonium carbonate, and the sample was washed with water. Thereafter, the sample was dried with a hot air dryer, further crushed with a screw type crusher, and then dry-classified using a 40-mesh sieve to obtain the plate-like inorganic filler (F2).

Production Example 4: Production of Plate-like Inorganic Filler (F4)

Mica raw material (muscovite, flake of approximately 10 to 30 mm) produced in Bihar, India was finely pulverized with a wet pulverizer and then wet-classified using a 150-mesh sieve. The sample after classification was dispersed in water and stirred for approximately 1 hour, and the classification by decantation of the supernatant after standing was repeated. Thereafter, the resultant was dried with a hot air dryer, further crushed with a screw type crusher, and then dry-classified using a 40-mesh sieve to obtain the plate-like inorganic filler (F4).

Production Example 5: Production of Plate-like Inorganic Filler (F5)

Mica raw material (muscovite, flake of approximately 10 to 30 mm) produced in North Carolina, USA was finely pulverized with a wet pulverizer and then wet-classified using a 150-mesh sieve. The classified sample was immersed in a citric acid solution adjusted to pH 3.0 for 1 day, and then stirred for approximately 1 hour. The supernatant was repeatedly classified by decantation and neutralized with ammonium carbonate, and the sample was washed with water. Thereafter, the sample was dried with a hot air dryer, further crushed with a screw type crusher, and then dry-classified using a 40-mesh sieve to obtain the plate-like inorganic filler (F5).

<Measurement of Particle Size of Plate-like Inorganic Filler>

Regarding each of the plate-like inorganic fillers (F1) to (F6), particle sizes (D50, D50*, and D90) were measured by the following measurement method, and a ratio (D50/D50*) of median diameters was determined. The results are shown in Table 1.

Measurement Method of D50:

The plate-like inorganic filler was dispersed in water to prepare an aqueous dispersion (slurry) having 5 mass % of the plate-like inorganic filler.

Regarding the aqueous dispersion (slurry), a volume-based particle size distribution was measured in accordance with JIS R 1629 using a laser diffraction type particle size distribution measuring device ("LA-950V2" manufactured by HORIBA, Ltd.). The D50 (median diameter) [μm] was calculated from a particle size value of 50% of a cumulative amount read from a cumulative particle size distribution curve based on the measurement of the particle size distribution.

Measurement Method of D90:

The plate-like inorganic filler was dispersed in water to prepare an aqueous dispersion (slurry) having 5 mass % of the plate-like inorganic filler.

Regarding the aqueous dispersion (slurry), a volume-based particle size distribution was measured in accordance with JIS R 1629 using a laser diffraction type particle size distribution measuring device ("LA-950V2" manufactured by HORIBA, Ltd.). The D90 [μm] was calculated from a particle size value of 90% of a cumulative amount from a fine particle side read from a cumulative particle size distribution curve based on the measurement of the particle size distribution.

Measurement Method of D50*:

The plate-like inorganic filler was dispersed in water by a dispersion device ("VS-25" manufactured by VELVO-CLEAR) with an ultrasonic output of 25 W and a dispersion time of 1 minute to prepare an aqueous dispersion (slurry) (20° C.) having 5 mass % of the plate-like inorganic filler.

Regarding the aqueous dispersion (slurry), a mass-based particle size distribution was measured in accordance with JIS R 1619 using a centrifugal sedimentation type particle size distribution measuring device ("SA-CP3" manufactured by Shimadzu Corporation.). The D50* (median diameter) [μm] was calculated from a particle size value of 50% of a cumulative amount read from a cumulative particle size distribution curve based on the measurement of the particle size distribution.

Ratio (D50/D50*) of Median Diameters:

Using the D50 and D50* calculated from the above, the ratio (D50/D50*) of median diameters was determined.

TABLE 1

|  |  | Plate-like inorganic filler | | | | | |
|---|---|---|---|---|---|---|---|
|  |  | (F1) | (F2) | (F3) | (F4) | (F5) | (F6) |
| D50 | μm | 20.5 | 34.2 | 21.7 | 35.8 | 21.2 | 27.1 |
| D50* | μm | 5.3 | 6.7 | 3.9 | 14.4 | 7.8 | 4.4 |
| D50/D50* | — | 3.9 | 5.1 | 5.5 | 2.5 | 2.7 | 6.2 |
| D90 | μm | 41.2 | 72.4 | 40.7 | 71.6 | 48.5 | 55.4 |

<Production of Liquid Crystal Polyester Composition>

Example 1

Using a Henschel mixer, 55 parts by mass of the liquid crystal polyester (L1), 45 parts by mass of the liquid crystal polyester (L2), and 33 parts by mass of the plate-like inorganic filler (F1) were mixed with each other.

Next, the obtained mixture was dried at 120° C. for 5 hours, melt-kneaded in a twin-screw extruder ("PCM-30" manufactured by Ikegai Corp.) with a vacuum vent under the conditions of a cylinder temperature of 340° C. and a screw rotation speed of 150 rpm while degassing with a vacuum vent using a water-sealed vacuum pump ("SW-25S" manufactured by SHINKO SEIKI CO., LTD.), and discharged in a strand shape through a circular nozzle (discharge port) having a diameter of 3 mm.

Next, the discharged kneaded product was passed through a water bath at a water temperature of 30° C. for 1.5 seconds, and then pelletized with a strand cutter (manufactured by TANABE PLASTICS MACHINERY CO., LTD.) to obtain a liquid crystal polyester composition in a form of pellets.

Example 2

A pelletized liquid crystal polyester composition was obtained in the same manner as in Example 1, except that 33 parts by mass of the plate-like inorganic filler (F2) was blended instead of 33 parts by mass of the plate-like inorganic filler (F1).

Example 3

A pelletized liquid crystal polyester composition was obtained in the same manner as in Example 1, except that 33 parts by mass of the plate-like inorganic filler (F3) was blended instead of 33 parts by mass of the plate-like inorganic filler (F1).

Comparative Example 1

A pelletized liquid crystal polyester composition was obtained in the same manner as in Example 1, except that 33 parts by mass of the plate-like inorganic filler (F4) was blended instead of 33 parts by mass of the plate-like inorganic filler (F1).

Comparative Example 2

A pelletized liquid crystal polyester composition was obtained in the same manner as in Example 1, except that 33 parts by mass of the plate-like inorganic filler (F5) was blended instead of 33 parts by mass of the plate-like inorganic filler (F1).

Comparative Example 3

A pelletized liquid crystal polyester composition was obtained in the same manner as in Example 1, except that 33 parts by mass of the plate-like inorganic filler (F6) was blended instead of 33 parts by mass of the plate-like inorganic filler (F1).

Example 4

A pelletized liquid crystal polyester composition was obtained in the same manner as in Example 1, except that 100 parts by mass of the liquid crystal polyester (L1) and 20 parts by mass of the plate-like inorganic filler (F3) were mixed with each other using a Henschel mixer to obtain a mixture.

Comparative Example 4

A pelletized liquid crystal polyester composition was obtained in the same manner as in Example 4, except that 20 parts by mass of the plate-like inorganic filler (F5) was blended instead of 20 parts by mass of the plate-like inorganic filler (F3).

Example 5

A pelletized liquid crystal polyester composition was obtained in the same manner as in Example 4, except that 20 parts by mass of the plate-like inorganic filler (F3) was changed to 49 parts by mass of the plate-like inorganic filler (F3).

Comparative Example 5

A pelletized liquid crystal polyester composition was obtained in the same manner as in Example 5, except that 49 parts by mass of the plate-like inorganic filler (F5) was blended instead of 49 parts by mass of the plate-like inorganic filler (F3).

<Production and Evaluation of Molded Body>

A molded body was produced from the liquid crystal polyester composition of each example by the following method, and mechanical strength, surface properties, dimensional stability, and heat resistance of the molded body, and fluidity of the liquid crystal polyester composition were evaluated. These results are shown in Tables 2 and 3.

[Evaluation of Mechanical Strength (Tensile Strength) of Molded Body]

Using an injection molding machine ("PNX40-5A" manufactured by NISSEI PLASTIC INDUSTRIAL CO., LTD.), under the following injection molding conditions, an ASTM No. 4 dumbbell test piece was produced as a molded body from the liquid crystal polyester composition.

Next, regarding the produced dumbbell test piece, a tensile test was performed in accordance with ASTM D638, and mechanical strength of the molded body was evaluated by measuring tensile strength at a test speed of 10 mm/min.

Injection Molding Conditions:
  Cylinder temperature: 340° C. (Examples 1 to 3 and Comparative Examples 1 to 3), 350° C. (Examples 4 and 5 and Comparative Examples 4 and 5)

Mold temperature: 130° C.
Injection speed: 75 mm/sec
Holding pressure: 25 MPa

[Evaluation of Fluidity of Liquid Crystal Polyester Composition]

FIG. 1 is a perspective view showing a mold for measuring a thin-walled flow length. The unit of the numerical value in FIG. 1 is mm.

Using a mold for measuring thin-walled flow length with a thickness of X mm (0.2 mm) and a width of 5.0 mm shown in FIG. 1, the liquid crystal polyester composition was molded by an injection molding machine ("Roboshot S2000i-30B" manufactured by FANUC CORPORATION) under the following injection molding conditions.

Regarding the molded body extracted from the mold, a test was performed to measure a length (0.2 mmt flow length) from a gate port to a flow end portion in a flow direction of the resin.

This test was performed on 10 molded bodies, and based on the average value for the length (0.2 mmt flow length) and the difference (variation) between the maximum value and the minimum value, fluidity of the liquid crystal polyester composition was evaluated according to the following standard.

Judgment G: a case where the average value of the flow length was large and the variation was small Judgment F: a case where either the average value of the flow length was large or the variation was small was not satisfied The average value of the flow length and the variation of the flow length here are based on the following values for each example.

[Average Value of Flow Length]

Examples 1 to 3 and Comparative Examples 1 to 3: equal to or smaller than 55 mm

Example 4 and Comparative Example 4: equal to or greater than 45 mm

Example 5 and Comparative Example 5: equal to or greater than 40 mm

[Variation in Flow Length]

Examples 1 to 5 and Comparative Examples 1 to 5: equal to or smaller than 5 mm

Injection molding conditions for producing the liquid crystal polyester molded body were set as follows.

[Injection Molding Conditions]
Cylinder temperature: 340° C. (Examples 1 to 3 and Comparative Examples 1 to 3), 350° C. (Examples 4 and 5 and Comparative Examples 4 and 5)
Mold temperature: 120° C.
Weighing value: 20 mm
Injection speed: 200 mm/sec
VP switching: pressure switching at 150 MPa
Holding pressure: 20 MPa

[Evaluation of Surface Properties of Molded Body]

In the above-described [Evaluation of Fluidity of Liquid Crystal Polyester Composition], by measuring surface roughness (arithmetic mean roughness Ra) of the flow end portion at a scanning speed of 0.5 mm/sec and a scanning distance of 3 mm using a surface roughness measuring instrument (SE600LK-31 manufactured by Kosaka Laboratory Ltd.) in a width direction of the surface of the flow end portion of the molded body, which was molded in a case of measuring the thickness 0.2 mmt flow length, surface smoothness (surface properties) of the flow end of the molded body was evaluated.

[Evaluation of Mechanical Strength (Bending Strength and Bending Modulus) of Molded Body]

Using an injection molding machine ("PNX40-5A" manufactured by NISSEI PLASTIC INDUSTRIAL CO., LTD.), under the following injection molding conditions, a rod-like test piece having a width of 12.7 mm, a length of 127 mm, and a thickness of 6.4 mm was produced as a molded body from the liquid crystal polyester composition.

Next, regarding the obtained rod-like test piece, a bending test was performed in accordance with ASTM D790, and mechanical strength of the molded body was evaluated by measuring bending strength and bending modulus at a test speed of 2 mm/min.

Injection Molding Conditions:
Cylinder temperature: 340° C. (Examples 1 to 3 and Comparative Examples 1 to 3), 350° C. (Examples 4 and 5 and Comparative Examples 4 and 5)
Mold temperature: 130° C.
Injection speed: 75 mm/sec
Holding pressure: 25 MPa

[Evaluation of Dimensional Stability of Molded Body]

Using an injection molding machine ("PNX40-5A" manufactured by NISSEI PLASTIC INDUSTRIAL CO., LTD.), under the following injection molding conditions, a 64 mm×64 mm×3 mint flat plate-like test piece was produced as a molded body from the liquid crystal polyester composition.

Next, using a micrometer, lengths of two sides of the liquid crystal polyester composition in a flow direction (MD) were measured, the average value thereof was obtained, and from the average value and the length of the MD of the mold cavity, shrinkage rate of the MD was calculated by the following expression.

In addition, regarding the produced flat plate-like test piece, lengths of two sides of the liquid crystal polyester composition in a direction (TD) orthogonal to the flow direction were measured, the average value thereof was obtained, and from the average value and the length of the TD of the mold cavity, shrinkage rate of the TD was calculated by the following expression.

Further, the sum of the shrinkage rate of the MD and the shrinkage rate of the TD was calculated to evaluate dimensional stability of the molded body.

Injection Molding Conditions:
Cylinder temperature: 340° C. (Examples 1 to 3 and Comparative Examples 1 to 3), 350° C. (Examples 4 and 5 and Comparative Examples 4 and 5)
Mold temperature: 130° C.
Injection speed: 75 mm/sec
Holding pressure: 25 MPa Shrinkage rate (%) of MD=([Length (μm) of MD of mold cavity]−[Average value (μm) of lengths of two sides of MD of molded body])/[Length (μm) of MD of mold cavity]×100

Shrinkage rate (%) of TD=([Length (μm) of TD of mold cavity]−[Average value (μm) of lengths of two sides of TD of molded body])/[Length (μm) of TD of mold cavity]×100

[Evaluation of Heat Resistance of Molded Body]

Using an injection molding machine ("PNX40-5A" manufactured by NISSEI PLASTIC INDUSTRIAL CO., LTD.), under the following injection molding conditions, a rod-like test piece having a width of 12.7 mm, a length of 127 mm, and a thickness of 6.4 mm was produced as a molded body from the liquid crystal polyester composition.

Next, regarding the produced rod-like test piece, heat resistance of the molded body was evaluated by measuring deflection temperature under load at a load of 1.82 MPa and a heating rate of 2° C./min in accordance with ASTM D648.

Injection Molding Conditions:
Cylinder temperature: 340° C. (Examples 1 to 3 and Comparative Examples 1 to 3), 350° C. (Examples 4 and 5 and Comparative Examples 4 and 5)
Mold temperature: 130° C.
Injection speed: 75 mm/sec
Holding pressure: 25 MPa

[Evaluation of Impact Resistance Characteristics of Molded Body]

Using an injection molding machine ("PNX40-5A" manufactured by NISSEI PLASTIC INDUSTRIAL CO., LTD.), under the following injection molding conditions, a rod-like test piece having a width of 12.7 mm, a length of 127 mm, and a thickness of 6.4 mm was produced as a molded body from the liquid crystal polyester composition.

Next, the produced rod-like test piece was divided into two equal parts in a long direction, and using the obtained test piece, an Izod impact test was performed in accordance with ASTM D256, and impact resistance characteristics of the molded body were evaluated by measuring Izod impact strength.

Injection Molding Conditions:
Cylinder temperature: 340° C. (Examples 1 to 3 and Comparative Examples 1 to 3), 350° C. (Examples 4 and 5 and Comparative Examples 4 and 5)
Mold temperature: 130° C.
Injection speed: 75 mm/sec
Holding pressure: 25 MPa

TABLE 2

| | | | | Example 1 | Example 2 | Example 3 | Comparative Example 1 | Comparative Example 2 | Comparative Example 3 |
|---|---|---|---|---|---|---|---|---|---|
| Liquid crystal polyester | | (L1) | Part by mass | 55 | 55 | 55 | 55 | 55 | 55 |
| | | (L2) | Part by mass | 45 | 45 | 45 | 45 | 45 | 45 |
| Plate-like inorganic filler | | (F1) | Part by mass | 33 | | | | | |
| | | (F2) | Part by mass | | 33 | | | | |
| | | (F3) | Part by mass | | | 33 | | | |
| | | (F4) | Part by mass | | | | 33 | | |
| | | (F5) | Part by mass | | | | | 33 | |
| | | (F6) | Part by mass | | | | | | 33 |
| | D50/D50* | | — | 3.9 | 5.1 | 5.5 | 2.5 | 2.7 | 6.2 |
| | D90 | | μm | 41.2 | 72.4 | 40.7 | 71.6 | 48.5 | 55.4 |
| Mechanical strength | Tensile strength | | MPa | 131 | 134 | 130 | 122 | 119 | 123 |
| Fluidity | 0.2 mmt flow length | Average | mm | 62 | 57 | 57 | 56 | 59 | 53 |
| | | Maximum − minimum | mm | 3 | 2 | 3 | 8 | 8 | 4 |
| | | Judgment | | G | G | G | F | F | F |
| Surface properties | Surface roughness of flow end portion | | μm | 0.35 | 0.39 | 0.34 | 0.67 | 0.75 | 0.41 |
| Mechanical strength | Bending strength | | MPa | 140 | 137 | 138 | 120 | 120 | 137 |
| | Bending modulus | | GPa | 10.3 | 10.9 | 10.9 | 9.3 | 8.0 | 10.5 |
| Dimensional stability | Molding shrinkage rate | MD | % | 0.23 | 0.18 | 0.25 | 0.26 | 0.24 | 0.28 |
| | | TD | % | 0.64 | 0.61 | 0.61 | 0.77 | 1.09 | 0.66 |
| | | MD + TD | % | 0.87 | 0.78 | 0.86 | 1.03 | 1.33 | 0.94 |
| Heat resistance | Deflection temperature under load | | ° C. | 242 | 240 | 238 | 233 | 231 | 240 |
| Impact resistance characteristics | Izod impact strength | | J/m | 582 | 483 | 588 | 445 | 580 | 561 |

From the comparison between Examples 1 to 3 and Comparative Examples 1 to 3 in Table 2, according to the liquid crystal polyester compositions of Examples 1 to 3 to which the present invention was applied, it could be confirmed that the fluidity was good and a molded body having improved mechanical strength (tensile strength, bending strength, and bending modulus), heat resistance, dimensional stability, and surface properties was obtained.

In addition, from the comparison between Examples 1 and 3 and Example 2, according to the liquid crystal polyester compositions of Examples 1 and 3, since the value of D90 was smaller than that of Example 2, it could be confirmed that a molded body having further improved impact resistance characteristics was obtained. According to the liquid crystal polyester composition of Example 2, it could be confirmed that a molded body having further improved dimensional stability was obtained.

bending modulus), heat resistance, dimensional stability, and surface properties was obtained.

The features described in the respective embodiments such as configurations and combinations of the configurations are only illustrative. Therefore, it is possible to add other configurations or to omit, replace or modify the configurations described herein without departing from the spirit of the present invention. Further, the scope of the present invention is not limited to the embodiments described hereinabove and is limited only by the Claims.

INDUSTRIAL APPLICABILITY

The present invention can be used for electrical and electronic parts or mechanical parts in which the wall thickness is thinner and shape is more complex, particularly

TABLE 3

|  |  |  | Example 4 | Comparative Example 4 | Example 5 | Comparative Example 5 |
|---|---|---|---|---|---|---|
| Liquid crystal polyester | (L1) | Part by mass | 100 | 100 | 100 | 100 |
|  | (L2) | Part by mass |  |  |  |  |
| Plate-like inorganic filler | (F1) | Part by mass |  |  |  |  |
|  | (F2) | Part by mass |  |  |  |  |
|  | (F3) | Part by mass | 20 |  | 49 |  |
|  | (F4) | Part by mass |  |  |  |  |
|  | (F5) | Part by mass |  | 20 |  | 49 |
|  | (F6) | Part by mass |  |  |  |  |
|  | D50/D50* |  | 5.5 | 2.7 | 5.5 | 2.7 |
|  | D90 | μm | 40.7 | 48.5 | 40.7 | 48.5 |
| Mechanical strength | Tensile strength | MPa | 148 | 123 | 132 | 104 |
| Fluidity | 0.2 mmt Average flow length | mm | 49 | 51 | 43 | 42 |
|  | Maximum − minimum | mm | 3 | 8 | 3 | 10 |
|  | Judgment |  | G | F | G | F |
| Surface properties | Surface roughness of flow end portion | μm | 0.29 | 0.74 | 0.33 | 0.78 |
| Mechanical strength | Bending strength | MPa | 120 | 117 | 138 | 117 |
|  | Bending modulus | GPa | 8.1 | 7.4 | 12.2 | 8.6 |
| Dimensional stability | Molding shrinkage rate | MD % | 0.25 | 0.32 | 0.27 | 0.40 |
|  |  | TD % | 0.97 | 1.13 | 0.44 | 0.84 |
|  |  | MD + TD % | 1.23 | 1.45 | 0.72 | 1.24 |
| Heat resistance | Deflection temperature under load | °C. | 254 | 249 | 262 | 254 |
| Impact resistance characteristics | Izod impact strength | J/m | 941 | 931 | 629 | 639 |

From the comparison between Example 4 and Comparative Example 4 in Table 3, according to the liquid crystal polyester composition of Example 4 to which the present invention was applied, it could be confirmed that the fluidity was good and a molded body having improved mechanical strength (tensile strength, bending strength, and bending modulus), heat resistance, dimensional stability, and surface properties was obtained.

In addition, from the comparison between Example 5 and Comparative Example 5 in Table 3, according to the liquid crystal polyester composition of Example 5 to which the present invention was applied, it could be confirmed that the fluidity was good and a molded body having improved mechanical strength (tensile strength, bending strength, and for molded bodies such as connectors, which are required to have high tensile strength, dimensional stability, and surface properties.

What is claimed is:
1. A liquid crystal polyester composition, comprising:
a liquid crystal polyester; and
a plate-like inorganic filler,
wherein:
the plate-like inorganic filler is mica,
a ratio (D50/D50*) of median diameters of the plate-like inorganic filler is 3.0 to 6.0, and a particle size D90 of the plate-like inorganic filler is equal to or smaller than 70 μm, the D50 is a median diameter of the plate-like inorganic filler measured by a laser diffraction method, wherein the plate-like inorganic filler is dispersed in water to prepare an aqueous dispersion, a volume-based particle size distribution of the aqueous dispersion is measured in accordance with JIS R 1629 using a laser diffraction type particle size distribution measuring device, and then the D50 is calculated from a particle size value of 50% of a cumulative amount read from a cumulative particle size distribution curve based on a measurement of the particle size distribution, the D50* is a median diameter of the plate-like inorganic filler measured by a centrifugal sedimentation method, wherein the plate-like inorganic filler is dispersed in water to prepare an aqueous dispersion, a mass-based particle size distribution of the aqueous dispersion is measured in accordance with JIS R 1619 using a centrifugal sedimentation type particle size distribution measuring device, and then the D50* is calculated from a particle size value of 50% of a cumulative amount read from a cumulative particle size distribution curve based on a measurement of the particle size distribution, and the D90 is a particle size value of 90% of a cumulative amount obtained from a volume-based cumulative particle size distribution curve of the plate-like inorganic filler measured by a laser diffraction method, wherein the plate-like inorganic filler is dispersed in water to prepare an aqueous dispersion, a volume-based particle size distribution of the aqueous dispersion is measured in accordance with JIS R 1629 using a laser diffraction type particle size distribution measuring device, and then the D90 is calculated from a particle size value of 90% of a cumulative amount from a fine particle side read from a cumulative particle size distribution curve based on a measurement of the particle size distribution.

2. The liquid crystal polyester composition according to claim 1,
wherein a content of the plate-like inorganic filler is 10 to 80 parts by mass with respect to 100 parts by mass of the liquid crystal polyester.

3. The liquid crystal polyester composition according to claim 1,
wherein the D50 of the plate-like inorganic filler is 15 to 40 μm.

4. The liquid crystal polyester composition according to claim 1,
wherein a particle size D90 of the plate-like inorganic filler is 40 to 70 μm.

5. The liquid crystal polyester composition according to claim 1,
wherein the liquid crystal polyester has a repeating unit (u1) represented by Formula (1), a repeating unit (u2) represented by Formula (2), and a repeating unit (u3) represented by Formula (3), $$—O—Ar^1—CO—  \qquad (1)$$

$$—CO—Ar^2—CO—  \qquad (2)$$

$$—X—Ar^3—Y—  \qquad (3)$$

in Formulae (1) to (3),
$Ar^1$ represents a phenylene group, a naphthylene group, or a biphenylylene group,
$Ar^2$ and $Ar^3$ each independently represents a phenylene group, a naphthylene group, a biphenylylene group, or a group represented by Formula (4),
X and Y each independently represents an oxygen atom or an imino group, and
one or more hydrogen atoms in the group represented by $Ar^1$, $Ar^2$, or $Ar^3$ may be each independently substituted with a halogen atom, an alkyl group having 1 to 28 carbon atoms, or an aryl group having 6 to 12 carbon atoms, $$—Ar^4—Z—Ar^5— \qquad (4)$$

in Formula (4), $Ar^4$ and $Ar^5$ each independently represents a phenylene group or a naphthylene group, and
Z represents an oxygen atom, a sulfur atom, a carbonyl group, a sulfonyl group, or an alkylidene group having 1 to 28 carbon atoms.

6. A molded body produced by including the liquid crystal polyester composition according to claim 1.

7. The molded body according to claim 6,
wherein a tensile strength of an ASTM No. 4 dumbbell test piece in a tensile test in accordance with ASTM D638 is 125 MPa or more.

8. The molded body according to claim 6,
wherein the molded body is a connector.

9. A production method of the molded body according to claim 6, comprising:
molding by melting the liquid crystal polyester composition.

10. The production method of the molded body according to claim 9,
wherein the molding is an injection molding.

11. The molded body according to claim 7,
wherein the molded body is a connector.

12. The liquid crystal polyester composition according to claim 1,
wherein the particle size D90 of the plate-like inorganic filler is 30 μm to 60 μm.

\* \* \* \* \*